Patented Aug. 31, 1943

2,328,361

UNITED STATES PATENT OFFICE 2,328,361

METHOD OF CONDITIONING SLUDGE

Marion D. Sanders, Chicago, Ill., assignor to Industrial Patents Corporation, Chicago, Ill., a corporation of Delaware No Drawing. Application August 23, 1939, Serial No. 291,618

25 Claims. (Cl. 210—2)

This invention relates to the treatment of wastes for the recovery of protein values.

One of the objects of this invention is to provide a method for the treatment of dilute wastes.

Another object of this invention is to provide a method for the treatment of sludge derived from packing house wastes.

Another object of the invention is to provide an economical and effective method for the treatment of sludges of high protein content.

Another object of this invention is to provide a method of increasing the rate of filtration of sludges of high protein content.

Other objects of the invention will become apparent from the description and claims which follow.

Various methods have been proposed from time to time and have been employed for the treatment of sewage, the primary object of all such methods being the removal of sufficient quantities of the solids and putrescible substances from the sewage to permit the discharge of the effluent into streams without danger of pollution. The treatment of municipal sewage, which is generally high in household wastes, has received considerable attention in recent years but the treatment of packing house wastes, specifically, has received little attention.

A widely used method for the treatment of municipal sewage may be termed the wet oxidative method in which the putrescible substances are destroyed by bacterial action. Attempts have been made from time to time to employ chemical methods in the treatment of sewage. Chemical methods in general have the advantage of requiring a lower plant investment, but have the disadvantage of having a high operating cost by reason of the cost of the chemicals, and as a result, chemical methods have been used to a limited extent. Generally, chemical methods do not result in a relatively pure effluent such as must be discharged by municipal sewage treatment plants which are capable of handling tremendously large quantities of sewage.

In ordinary practice, there are three types of sewage or wastes produced in the packing plant. The usual sanitary sewage is discharged into the sanitary sewers. This type of sewage is not considered a packing house waste.

The second type of waste consists of the effluent from the manure screens and the wash water employed in flushing the intestinal tracts of the slaughtered animals. The intestinal contents removed from the slaughtered animals is normally passed to manure screens to screen off the coarse solids. The wash water employed in flushing the intestinal tracts may also be passed to the manure screens to remove coarse solids. The effluent may be further reduced in solids content by settling or filtration. The effluent contains considerable quantities of suspended matter and constitutes a large portion of the packing house wastes with which the present invention is concerned.

The third type of packing house waste is the bulk of the material and consists of water which has been used for washing and in various operations incident to the slaughter and dressing of carcasses and the processing of by-products, and is a further type of packing house waste with which the present invention is concerned. The second and third types of wastes are combined and treated as one in accordance with the present invention.

The combined waste is rich in various proteins and fats, including blood, serums, tissue, and grease, and is conventionally passed to a skimming basin where the floating grease is removed for such uses as soap making. The effluent from the skimming basin normally includes approximately from 2,000 to 5,000 parts per million of suspended and dissolved solids and is discharged to the sewers, finding its way directly to a stream or to a municipal sewage treatment plant.

Packing house wastes normally have a biochemical oxygen demand of from 500 to 2,000 parts per million. River water which has not been polluted is normally saturated with oxygen containing from 5 to 7 parts per million. Since it is generally considered that an oxygen content of less than 2½ parts per million renders water dangerous to marine life and the biochemical oxygen demand of the raw waste is so great, the discharge of raw packing house wastes into streams or river water reduces the oxygen content to a point which is dangerous to marine life.

The present invention is particularly adapted to the treatment of packing house wastes to reduce the biochemical oxygen demand of the effluent sufficiently to permit the effluent to be discharged into a stream without dangerous pollution of the water, and to the treatment of packing house wastes for the recovery of valuable solids in the wastes.

In my copending application entitled Treatment of wastes, Serial No. 110,007, filed November 9, 1936, which has matured into United States Patent No. 2,204,703, I have described and claimed a method of treating packing house wastes in which the raw wastes are first carried to a skimming basin where the floating grease is removed. The degreased waste is then treated with a protein coagulant, for example, aluminum sulphate, aluminum chloride, thorium nitrate, ferric sulphate, or ferric chloride, to flocculate the suspended materials, and the pH of the treated waste is adjusted to from 4.0 to 5.5, the optimum pH for the flocculation of the suspended solids being about 4.8. Sulphuric acid serves as a convenient and relatively inexpensive substance which may be employed to adjust the pH to the desired point although any mineral acid or other substance capable of adjusting the pH to the desired point may be employed.

After the reagents have been added to the waste, the mixture is thoroughly agitated to disperse or distribute the reagents throughout the waste, after which the protein and other suspended substances are permitted to flocculate and subsequently settle. The flocculated and settled substances are then separated from the effluent to form a sludge which may be conveyed to storage tanks or pits. Sludge recovered from packing house wastes as described above has a solids content of approximately 2 per cent to 6 per cent.

In my copending application entitled Sludge treatment, Serial No. 110,008, filed November 9, 1936, which has matured into United States Patent No. 2,277,718, I have described and claimed a method of recovering the protein from the sludge. In accordance with the method therein described and claimed, the raw sludge is partially dewatered and conditioned for filtration by the application of heat. The sludge may be heated in any desired manner but I have found that the injection of steam is the most efficient method. The temperature of the sludge is raised to a temperature above 150 degrees F., preferably to a temperature of from 180 degrees F to 200 degrees F.

The preferred procedure in practicing the invention described in this copending application includes a fermentation step prior to the heating step. The fermentation is not a digestion for the purpose of destroying various materials and is not carried to anything which approaches substantial digestion of the substances. In accordance with the preferred procedure, the sludge is permitted to remain at a temperature of from 65 degrees to 110 degrees F. for a period of about twenty four hours. During this short fermentation period, sufficient gas is formed in the sludge before the application of heat to effectively carry the coagulated material to the top of the vessel to form a layer of semisolids. This semisolid mass has a solids content of about 10 per cent to 15 per cent. The waste material is then heated to a temperature above 150 degrees F., as described above.

After coagulation and partial dewatering of the sludge, the relatively clear water beneath the sludge is removed. The partially dewatered sludge is then further dewatered by filtration, for example, by a vacuum filter. As pointed out in my copending application entitled Sludge treatment, I have found that heating the raw sludge derived from packing house wastes at the temperatures indicated for a period of about five minutes permits the accumulation of about four pounds to eight pounds of dry solids per hour for each square foot of filter area.

I have discovered that the sludge may be conditioned to greatly accelerate the rate of filtration. After the sludge is partially dewatered by heating to a temperature above 150 degrees F. and prior to filtration, a small amount of a water soluble salt of calcium is added to the sludge. I have discovered that the treatment of the sludge with a small amount of a water soluble salt of calcium increases the rate of filtration five fold or more and produces a drier filter cake than is produced by filtration of unconditioned sludge. I have also found that the conditioning of sludge with a small amount of a water soluble salt of calcium permits a vacuum filter to be employed indefinitely without blinding, or without the necessity of stopping the operation to remove and wash the filter cloths.

In large scale operations, I have found that vacuum filters employed in filtering unconditioned sludge must be shut down for cleaning purposes several times an hour, whereas conditioning with a water soluble salt of calcium permits the vacuum filter to be used indefinitely without shutting down the apparatus. I have found that although the filter cake generally varies in thickness from $\frac{1}{16}$ inch to $\frac{1}{4}$ inch in the practice of the invention described in my copending applications mentioned above, in large scale operations a conditioning of the partially dewatered sludge with a water soluble salt of calcium results in the production of a filter cake varying from $\frac{1}{4}$ inch to 1 inch. Although the thickness of the filter cake which is produced is of great technical and economical importance, the most important feature is the condition of the filter cloth after discharge of the filter cake.

In Table I which follows may be found data obtained in vacuum filter leaf tests on concentrated sludge prepared from packing house wastes in accordance with the method described above with and without the addition of a water soluble salt of calcium.

Table I

| | Sample | | | |
|---|---|---|---|---|
| | 1 | 2 | 3 | 4 |
| Chemical added (3% on weight of dry solids). | None | $CaCl_2$ | $Ca(NO_3)_2$ | $Ca(H_2PO_4)_2$ |
| Cake thickness. | $\frac{3}{16}''$ | $\frac{1}{2}''$ | $\frac{1}{2}''$ | $\frac{1}{4}''$. |
| Condition of cloth after discharge of cake. | Smeared | Clean | Clean | Clean. |
| Condition of cake. | Too wet and gummy. | Dry | Reasonably dry. | Dry. |

In obtaining the data reported in Table I a batch of concentrated sludge was divided into four samples. The concentrated sludge was produced by holding chemically precipitated sludge in a settling tank and contained from 6 per cent to 8 per cent solids. The sludge was heated to about 190 degrees F. and in those cases indicated, the water soluble salt of calcium added after heating and before filtration. In this series of tests the amount of conditioning chemical added to the heated concentrated sludge was about 3 per cent, based upon the weight of the dry solid content of the sludge.

A vacuum filter leaf covered with muslin was submerged in the sludge for a period of approximately two minutes, a vacuum of approximately 18 inches having been applied to the leaf prior to submergence of the leaf in the sludge. The water soluble salts of calcium employed in these tests were calcium chloride, calcium nitrate, and monocalcium phosphate. It will be noted that in those cases in which calcium chloride and calcium nitrate were employed to condition the sludge for filtration, the thickness of the filter cake was $\frac{1}{2}$ inch, whereas the thickness of the filter cake of unconditioned sludge is but $\frac{1}{16}$ inch. Although the thickness of the filter cake when the sludge was conditioned with mono-calcium phosphate was slightly less than the thickness of the filter cake when no conditioning calcium salt was added to the sludge, there was a distinct and significant improvement in the use of the calcium acid phosphate since the condition of the filter cloth after discharge of the filter cake was clean as compared to the smeared condition of the filter cloth when no conditioning calcium salt was added to the sludge. In the use of continuous vacuum filters, smearing of the filter surface causes a blinding of the surface, thereby necessitating a shutting down of the filter for cleaning purposes. It will also be noted that in the case of the unconditioned sludge, the filter cake is too wet and gummy whereas in all cases where the sludge was first conditioned with a water soluble calcium salt, the filter cake was reasonably dry or dry. The data of Table I clearly indicates the technical and economical advantage of conditioning the sludge with a water soluble salt of calcium prior to filtration.

Although the data of Table I was obtained by employing about 3 per cent of a soluble calcium salt, based upon the weight of the dry solids in the concentrated sludge, the proportion of calcium salt which is added to the sludge may vary over a wide range. I have found that from about one pound to three pounds of the calcium salts, for example, calcium chloride, to each 100 gallons of concentrated sludge, that is, from about 1.5 per cent to 6 per cent of the calcium salts, based upon the weight of the dry solids in the sludge employed in these tests, gives very satisfactory results. The addition of the water soluble salts of calcium may be made to fresh dilute sludge, concentrated sludge, or fermented and partially dewatered sludge. It is apparent, however, that because of economic reasons it is preferable to first concentrate or partially dewater the sludge prior to filtration to reduce the quantity of water which must be removed through the vacuum filter.

In the vacuum filter leaf tests which are reported in Table II, the filter leaves were covered with muslin and submerged in the sludge for a period of about four minutes, a vacuum of approximately 18 inches being first applied to the covered filter leaf. At the end of four minutes the filter leaf was withdrawn and allowed to drain with the vacuum on, and the cake was then discharged with a two pound air blast through the filter cloth. All of the individual samples of sludge were portions of a full batch of chemically precipitated sludge from packing house wastes.

In the case of sample No. 1, the chemically precipitated sludge was tested in a fresh, dilute condition. The fresh, dilute sludge was first heated to a temperature of about 190 degrees and the vacuum filter leaf submerged in the sludge for a period of about four minutes. As will be noted, the thickness of the filter cake was thin and after a discharge of the filter cake from the filter cloth, the filter cloth was smeared.

Sample No. 1 was then treated by adding about 5 per cent calcium chloride to the sludge. A filter leaf was then submerged in the sludge for about four minutes. The thickness of the filter cake was thin because of the dilute condition of the sludge, but upon discharge of the filter cake from the cloth, the filter cloth was left in a clean condition.

The term "fresh and dilute" refers to sludge which has been precipitated chemically, is in an unfermented condition, and contains about 2 per cent solids.

In the case of sample No. 2, the sludge was first concentrated to a solids content of from 4 per cent to 6 per cent by holding the sludge in a settling tank. The concentrated sludge was then fermented by holding the concentrated sludge at a temperature of from 65 degrees to 110 degrees F. for a period of about twenty-four hours. The concentrated and fermented sludge was then heated to a temperature of about 190 degrees. A vacuum filter leaf was submerged in the heat treated sludge for a period of about four minutes. The thickness of the filter cake was thin, and upon discharge of the cake from the filter leaf, the filter cloth was left in a smeared condition. About 5 per cent calcium chloride, based upon the weight of the solids in the sludge, was then added and mixed with the sludge and a second vacuum filter leaf submerged in the treated sludge for a period of about four minutes. It will be noted that the thickness of the filter cake was one half inch whereas the thickness of the filter cake obtained from unconditioned sludge was but 1/16 inch. After discharge of the filter cake from the filter leaf, the filter cloth was left in a clean condition.

In the case of sample No. 3, the calcium chloride was added to concentrated and fermented sludge prior to heating to a temperature of about 190 degrees F. The amount of conditioning calcium chloride was based upon the weight of the dry solids in the sludge. It will be noted that the thickness of the filter cake was extremely thin and that the filter cloth was smeared. The thickness of the filter cake was too thin to permit a removal of any material. The addition of the calcium salts to the sludge before heat treatment is of no benefit in conditioning the sludge.

In the case of sample No. 4, the entire sample

Table II

| | #1 | | #2 | | #3 | #4 | | | |
|---|---|---|---|---|---|---|---|---|---|
| | a | b | a | b | | a | b | c | d |
| Condition of sludge. | Fresh and dilute | | Concentrated and fermented. | | Concentrated and fermented. | Concentrated and fermented. | | | |
| Temp., °F | 190 | 190 | 190 | 190 | 190 | 190 | 190 | 190 | 190. |
| Chemicals (per cent on dry solids). | None | 5% CaCl₂ afterheating. | None | 5% CaCl₂ afterheating. | 5% CaCl₂ added before heating. | None | 3% CaCl₂ afterheating. | 6% CaCl₂ afterheating. | 18% CaCl₂ after heating. |
| Thickness of cake. Condition of cloth after discharge. | 1/32″ Smeared | 1/32″ Clean | 1/16″ Smeared | 1/2″ Clean | 1/64″ Smeared | 1/8″ Smeared slightly. | 5/8″ Clean | 5/8″ Clean | 5/8″ Clean. | removal of the cake from the filter, the filter cloth was in a slightly smeared condition.

About 3 per cent calcium chloride, based upon the weight of the dry solids in the sludge, was then added to the sludge and a second vacuum filter leaf submerged in the treated sludge for a period of about four minutes. The thickness of the filter cake was about 5/8 inch, and upon discharge of the filter cake from the filter leaf, the filter cloth was in a clean condition.

An additional 3 per cent calcium chloride was then added to the sludge, making a total of 6 per cent added calcium chloride. A third vacuum filter leaf was submerged in the treated sludge for a period of about four minutes. The thickness of the filter cake was about 5/8 inch, and upon discharge of the filter cake from the filter, the cloth was left in a clean condition.

An additional 12 per cent calcium chloride was then added to the sludge, making a total of 18 per cent calcium chloride added to the sludge. A fourth vacuum filter leaf was submerged in the sludge for about four minutes. The filter cake produced was about 5/8 inch in thickness, and upon discharge of the cake from the filter leaf, the cloth was left in a clean condition.

In each case, the addition of calcium chloride after heat treatment of the sludge results in the production of a filter cake of substantially greater thickness than that produced without the addition of the calcium chloride, and the filter cloth was left in a clean condition after discharge of the filter cake. It will be noted that the thickness of the filter cake does not appear to vary with an increase in the quantity of conditioning chemical.

The term "soluble salts of calcium" is employed in the present specification and claims to designate those salts of calcium which are sufficiently soluble in water to produce the desired concentration of calcium salt in the sludge.

Although I have described the invention in which a vacuum filter is employed to recover the solids, a drain bed may be employed. The conditioning of the sludge with the calcium salts effects a like improvement in the rate of draining of the sludge when placed upon a drain bed.

Although any of the soluble salts of calcium may be employed in conditioning the chemically precipitated sludge prepared in accordance with the method described above, I prefer to employ calcium chloride. It is obvious that the calcium chloride since it is relatively inexpensive and is quite soluble in water is the most practical from an economic standpoint. However, any of the water soluble calcium salts may be employed.

The recovered solids in the filter cakes may be dried in any desired manner, for example, in a conventional rotary or other type of drier. The dried cakes will contain approximately 90 per cent solids. The dried material contains protein, fat, and some moisture, besides certain inert substances and small quantities of calcium salts, ferric oxide, and other minerals. As pointed out in my copending application, Serial No. 110,008, the dried cake may be employed in the preparation of animal feeds since it contains a large percentage of protein matter.

The end product which results from the treatment of normal packing house wastes in accordance with the present invention will vary in analysis depending upon the operation of the packing house. A sample of the end product produced from a packing house waste secured from a grease skimming basin which was relatively inefficient contained 4.40 per cent moisture, 35.22 per cent fat, and 40.38 per cent protein. A sample of the end product produced from a packing house waste which had been efficiently degreased and contained in the original state about 100 parts per million of fat contained 5.0 per cent moisture, 23.8 per cent fat, and 46.4 per cent protein.

If desired, the high grease or fat content may be reduced and the protein content increased by hot-pressing the substantially dewatered sludge in a hydraulic press or extracting the fat with appropriate solvents. The dried sludge or filter cake is high in food value and is comparable in characteristics to digester tankage, which is an important ingredient of animal feed used in swine and other livestock feeding. It is merely necessary to grind the sludge cake for use in animal feeds, whereupon it is in condition for packaging and shipment or immediate use.

I claim:

1. The method of treating packing house waste water containing protein which comprises precipitating the protein by adding an acid, flocculating the precipitated protein by adding a protein coagulant, separating the flocculated material from the effluent to form a sludge, coagulating the protein by heating, adding a water soluble salt of calcium to the coagulated protein, and recovering the coagulated protein and solids from the sludge.

2. The method of treating packing house waste water containing protein which comprises precipitating the protein in the waste by the addition of a mineral acid in quantities sufficient to adjust the pH value of the waste to between 4.0 and 5.5, flocculating the precipitated protein by adding a protein coagulant, separating the flocculated material from the effluent to form a sludge, coagulating the protein in the sludge by heating the sludge to a temperature above 150 degrees F., adding a water soluble salt of calcium to the heated sludge, and recoving the protein from the sludge.

3. The method of treating packing house waste water containing protein which comprises precipitating the protein by adding an acid, flocculating the precipitated protein by adding a protein coagulant, separating the flocculated material from the effluent to form a sludge, coagulating the protein by heating the sludge, adding to the heated sludge from one pound to three pounds of a water soluble salt of calcium for each 100 gallons of sludge, and recovering the protein from the sludge.

4. The method of treating packing house waste water containing protein which comprises precipitating the protein by adding an acid, flocculating the precipitated protein by adding a protein coagulant, separating the flocculated material from the effluent to form a sludge, coagulating the protein by heating the sludge, adding to the heated sludge from 1.5 per cent to 18 per cent of a water soluble salt of calcium, based upon the weight of the dry solids in the sludge, and recovering the protein from the sludge.

5. The method of treating packing house waste water containing protein which comprises precipitating the protein by adding an acid, flocculating the precipitated protein by adding a protein coagulant, separating the flocculated material from the effluent to form a sludge, coagulating the protein by heating the sludge, adding to the heat treated sludge from 1.5 per cent to 18 per cent calcium chloride, based upon the weight of the dry solids in the sludge, and recovering the protein from the sludge.

6. The method of treating packing house waste water containing protein which comprises precipitating the protein by adding an acid, flocculating the precipitated protein by adding a protein coagulant, separating the flocculated material from the effluent to form a sludge, coagulating the protein by heating the sludge, adding to the heat treated sludge from 1.5 per cent to 18 per cent calcium nitrate, based upon the weight of the dry solids in the sludge, and recovering the protein from the sludge.

7. The method of treating packing house waste water containing protein which comprises precipitating the protein by adding an acid, flocculating the precipitated protein by adding a protein coagulant, separating the flocculated material from the effluent to form a sludge, coagulating the protein by heating the sludge, adding to the heat treated sludge from 1.5 per cent to 18 per cent of monocalcium phosphate, based upon the weight of the dry solids contained in the sludge, and recovering the protein from the sludge.

8. The method of recovering protein bearing material from sludge which comprises coagulating the protein by heating the sludge, adding a water soluble salt of calcium to the heat treated sludge, and separating the protein bearing material from the sludge.

9. The method of recovering solids from a suspension of protein flocculated from packing house wastes by the addition of a protein coagulant which comprises heating the suspension of protein to a temperature above 150 degrees F., adding to the heat treated suspension a water soluble salt of calcium, and separating the solids from the suspension.

10. The method of recovering solids from a suspension of protein flocculated from packing house wastes by the addition of a protein coagulant which comprises heating the suspension of protein to a temperature of from 180 degrees to 200 degrees F., adding a water soluble salt of calcium to the heat treated suspension, and separating the solids from the suspension.

11. The method of recovering solids from a suspension of protein flocculated from packing house wastes by the addition of a protein coagulant which comprises heating the suspension of protein to a temperature above 150 degrees F., adding calcium chloride to the heated suspension, and separating the solids from the suspension.

12. The method of recovering solids from a suspension of protein flocculated from packing house wastes by the addition of a protein coagulant which comprises heating the suspension of protein to a temperature above 150 degrees F., adding calcium nitrate to the heated suspension, and separating the solids from the suspension.

13. The method of recovering solids from a concentrated suspension of protein flocculated from packing house wastes by the addition of a protein coagulant which comprises heating the concentrated suspension of protein to a temperature above 150 degrees F., adding monocalcium phosphate to the heated suspension, and separating the solids from the suspension.

14. The method of conditioning sludge for filtration derived from packing house wastes by treatment with a mineral acid and a protein coagulant which comprises heating the sludge to a temperature above 150 degrees F. to coagulate the protein in the sludge, and adding a water soluble salt of calcium to the heat treated sludge.

15. The method of conditioning sludge for filtration derived from packing house wastes by treatment with a mineral acid and a protein coagulant which comprises heating the sludge to a temperature of from 180 degrees F. to 200 degrees F. to coagulate the protein in the sludge, and adding a water soluble salt of calcium to the heated sludge.

16. The method of conditioning sludge for filtration derived from packing house wastes by treatment with a mineral acid and a protein coagulant which comprises heating the sludge to a temperature above 150 degrees F. to coagulate the protein in the sludge, and adding calcium chloride to the heated sludge.

17. The method of conditioning sludge for filtration derived from packing house wastes by treatment with a mineral acid and a protein coagulant which comprises heating the sludge to a temperature above 150 degrees F. to coagulate the protein in the sludge, and adding calcium nitrate to the heated sludge.

18. The method of conditioning sludge for filtration derived from packing house wastes by treatment with a mineral acid and a protein coagulant which comprises heating the sludge to a temperature above 150 degrees F. to coagulate the protein in the sludge, and adding monocalcium phosphate to the heated sludge.

19. The method of conditioning sludge derived from packing house wastes by treatment with a mineral acid and a protein coagulant which comprises heating the sludge to a temperature of from 180° F. to 200° F. to coagulate the protein in the sludge, adding calcium chloride to the heated sludge and filtering the sludge so treated.

20. The method of conditioning sludge derived from packing house wastes by treatment with a mineral acid and a protein coagulant which comprises heating the sludge to a temperature within the range of about 180° F. to 200° F. to coagulate the protein in the sludge, adding a water soluble salt of calcium to the heated sludge and separating the protein from the sludge.

21. A process according to claim 20 in which the separation of the protein from the sludge is made by continuous vacuum filtration.

22. The method of treating sludge derived from packing house wastes by treatment with a mineral acid and a protein coagulant which comprises heating the sludge to above 150° F. to coagulate the protein in the sludge, adding a water soluble salt of calcium to the heated sludge and filtering the sludge so treated.

23. The method of treating sludge derived from packing house wastes by treatment with a mineral acid and a protein coagulant which comprises heating the sludge to a temperature within the range of about 180° F. to 200° F. to coagulate the protein in the sludge, adding a water soluble salt of calcium to the heated sludge and filtering the sludge so treated.

24. A process according to claim 23 in which the calcium salt is calcium nitrate.

25. A process according to claim 23 in which the calcium salt is monocalcium phosphate.

MARION D. SANDERS.